March 21, 1939.　　R. F. HENDERSHOT ET AL　　2,151,105
ELECTRIC GRILL
Filed July 6, 1936　　2 Sheets-Sheet 1
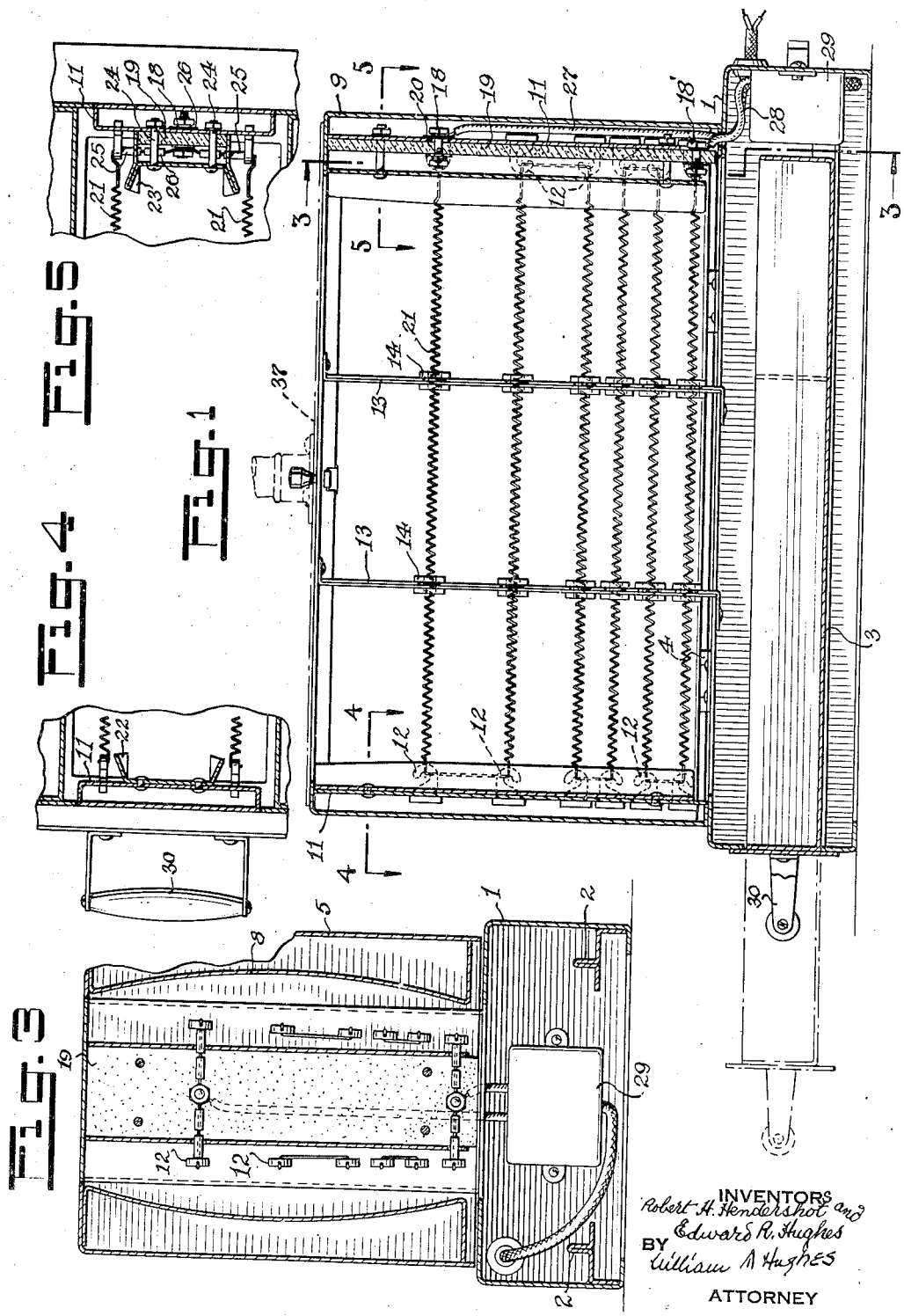
INVENTORS
Robert H. Hendershot and
Edward R. Hughes
BY William A. Hughes
ATTORNEY

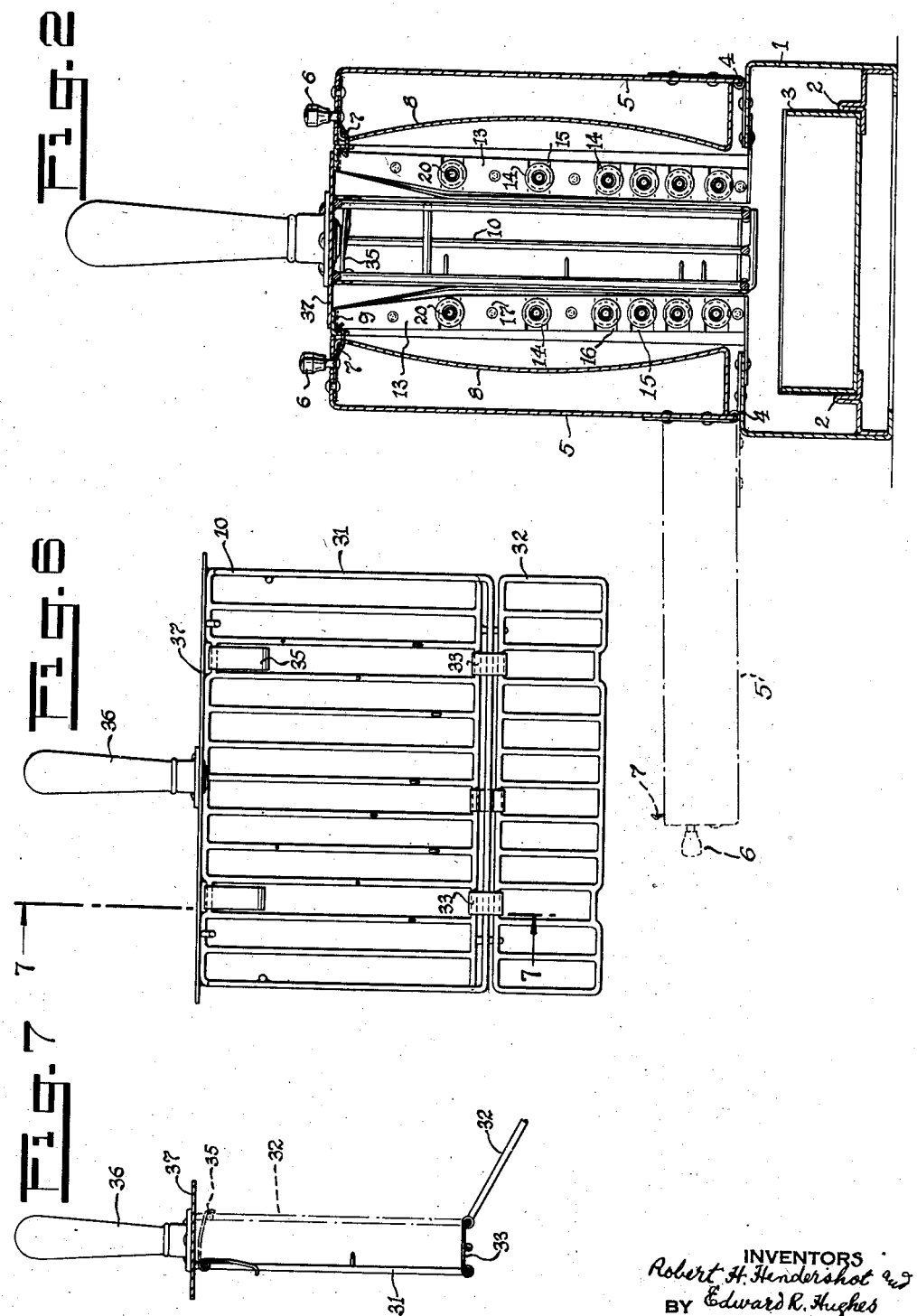

Patented Mar. 21, 1939

2,151,105

UNITED STATES PATENT OFFICE 2,151,105

ELECTRIC GRILL

Robert F. Hendershot, Arlington, and Edward R. Hughes, Morristown, N. J.

Application July 6, 1936, Serial No. 89,012

1 Claim. (Cl. 219—19)

The present invention relates to new and useful improvements in electrical heating appliances and has more particular reference to an electric broiler for use in the broiling of meats, fish and the like. The primary object of the invention resides in the provision of a device of this character which provides a novel arrangement of the heating elements to insure the most efficient and a substantially uniform heating of the articles to be broiled.

Another important object of this invention is to provide an electric broiler in which there is such a co-relation of the heating elements, a heat reflecting element and a grill member adapted to hold pieces of food that the greatest conservation of heat energy is realized and a uniform distribution of the applied heat automatically provided.

Another object of the invention is to provide means for removing the grill member which is adapted to hold the food in a convenient manner and in a manner to obviate the tendency to burn the hands of one who manipulates the device.

Another object of this invention is to provide such an arrangement and construction of parts that the manufacture of the broiler can be carried on in a most economical manner.

In the specifications following, wherein an illustrative embodiment of this invention is described, reference is made to the accompanying drawings in which Fig. 1 is a sectional longitudinal elevation of the entire broiler showing with modified lines the outline of the holder for the food-retaining grill at the top and the pulled out position of a tray mounted in the bottom;

Fig. 2 is a transverse section through the entire broiler showing the food retaining grill in position and showing by modified lines one of the reflector retaining covers in a full open position;

Fig. 3 is a cross section looking in the direction of the arrows at the line 3—3 in Fig. 1, and this figure shows the detail of the electrical connections to the heating elements and their relative disposition in the device;

Fig. 4 is a section looking in the direction of the arrows at the line 4—4 of Fig. 1;

Fig. 5 is a cross section looking in the direction of the arrows at the line 5—5 in Fig. 1;

Fig. 6 is an elevation view of the food retaining grill member shown in the open position; and Fig. 7 is a cross section view looking in the direction of the arrows at the line 7—7 of Fig. 6, showing with modified line the grill member in a closed position.

Referring to the drawings, we have disclosed therein a broiler comprising a base in the form of a chamber 1 of sheet metal in which is provided the slide supports 2, 2 for a sliding tray 3.

Mounted on top of this chamber 1 are two pairs of hinges 4. These hinges may be riveted, as shown, or may be spot welded in position. Attached to each pair of hinges 4, 4 (see Fig. 2) is a pair of covers 5, 5 which are provided at their upper end with a handle knob 6 and a spring retaining latch 7. Fastened within these covers 5, 5 are reflectors 8, 8, each being in the form of a sheet of metal fastened in position, as shown, having a slightly greater curvature toward the top limit thereof than toward the bottom.

Referring to Fig. 3, the space enclosed by the reflectors 8, 8 and the cover members 5, 5 may conveniently contain heat insulating material which aids in the conservation of the heat energy and prevents its being radiated through the metal of said covers 5, 5. Said reflectors 8, 8 are provided with highly polished inner faces which are preferably plated with some protective and/or reflective coating such as chromium or the like.

Fastened on top of the supporting chamber 1, and near each end thereof, is an upright supporting member 9 which, with said covers 5, 5 defines a broiling chamber and is generally in the form of an inverted U with turned-in lower ends, as shown, and has a central longitudinal opening 9' through the top thereof which is suitable for the admittance of a food-holding grill 10. Said supporting member 9 may be regarded as the vertical supporting member for the broiling device and rests on top of said chamber 1. Fastened in a well-known manner, such as by welding or otherwise, to said supporting member 9 is a pair of U-shaped sheet metal members 11, 11 (see Figs. 4 and 5). Attached to said members 11, 11 is a series of hooks 12, 12 preferably made of insulating material.

With reference to Fig. 1 and Fig. 3, it will be seen that said hooks 12, 12 are held in position by being passed through holes in said sheet metal members 11, 11, said hooks 12, 12 being provided with extending flanges, which prevent them from passing clear through the holes. Said supporting hooks 12, 12 as shown in Fig. 1 and Fig. 3 are arranged in rows on either side of the broiling chamber defined by covers 5, 5 and supporting member 9 in such a manner that the lower part of the rows of supports are nearer to the center of the broiling chamber than are the upper parts of the rows. They are also arranged so that the successive supporting hooks are nearer one to the other toward the bottom of the row than they are toward the top of the row. All this ensures that there shall be a greater amount of heat from the heating element supported on these hooks directed toward the broiling chamber near the bottom of the chamber than is so directed at the top.

Positioned as shown in Fig. 1 between the top of said vertical supporting member 9 and the top said chamber base member 1, and fastened thereto are support members 13, 13 (see Figs. 1 and 2). Insulating sleeves 14, 14 made of an insulating ceramic or earth are mounted on the support members 13, 13 in slots 15, 15 into which they may be slipped. Provision is made for riveting a retaining member 16 by means of the rivets 17, 17 to retain said insulating sleeves 14, 14 in position in said slots 15, 15. Any convenient method may be resorted to for mounting said insulating sleeves 14, 14 in said support members 13, 13.

A heating unit comprises an electrical resistance wire, such as nichrome, which is mounted as follows:

With reference to Fig. 1, a screw 18 fastens a rigid insulating panel 19 to said sheet metal member 11 (see Fig. 5). Said screw 18 is insulated from member 11 by means of an insulating washer 20, as shown in Fig. 1. From said screw 18 an electrical resistance wire 21 is conducted through the insulating sleeves 14, 14 around the hook members 12, 12 as shown, and back throughout the length of the broiler device, as shown in Fig. 1, and so is wound back and forth until it is finally connected to a second connection screw 18', which is a duplicate of the screw 18. Two such resistance wires are mounted, as shown in Fig. 2, and they are positioned, one each side of the central chamber in which is retained said food retaining grill 10, positioned as shown very closely to this chamber.

A pair of co-acting U-shaped sheet metal members 22, 23 (see Figs. 4 and 5) is provided one on the inner surface of each of the vertical arms of said inverted U-shaped sheet metal member 11 to serve as opposed guides for the grill 10 when the latter is slid in position downward into the central chamber of the broiler. Said U-shaped guide member 22 is fastened by riveting or otherwise to the member 11, as shown. As shown in Fig. 5, said guide member 23 is spaced apart from said member 11 to provide room within which the connections between the two heating wires 21, 21 and the connection screws 18 and 18' are made. Said guide member 23 is held in position by means of retaining screws and nuts 24, 24 extending through said member 11.

To permit said resistance wires 21, 21 to pass through holes in the member 23 into the connection chamber described above without making electrical contact with said guide member 23, ceramic insulating sleeves 25 and 26 are passed over the wire and positioned as shown.

Connected to the connection screws 18 and 18' is a pair of wires 27 and 28 which serve to connect said resistance wires 21, 21 to a source of electrical energy through a suitable switch member 29 which may be of any convenient form, as shown in the sketches merely in outline.

Said sliding tray 3 (see Fig. 1) is held on the slide supports 2, 2 (see Fig. 2), and is adapted to be drawn in and out by means of a handle 30. Said sliding tray 3 serves to catch the liquid which may drip from the article to be cooked above, between the heating members, and is preferably made of some material that will not tarnish readily and will not contaminate these juices, should it be desirable to use the juices for human consumption.

Said grill 10, shown in Figs. 6 and 7, is constructed in a now well-known manner by forming the grill work of suitable wires shaped and welded in some such form as shown in Fig. 6, and comprising two sections 31 and 32 hinged together along one edge as shown by the hinges 33, 33. When in the closed position, these grill members assume the position shown in Fig. 7 by the modified line of section 32, the two members being held together by the latch 35, as shown. One important feature of said grill 10 is a handle 36 which comprises at least in part a substance which is a poor conductor of heat and which is of sufficient length relative to the grill as shown particularly in Fig. 2 so that the grill laden with food and in a hot condition may be conveniently handled without having the hand contact with the metallic top part 37 which serves to hold the grill in position as shown in Fig. 2. When it is extended downwardly into the central chamber of the broiler this plate 37 encounters the member 9 and serves to hold the grill up in position.

While broilers of the general type disclosed herein are not new in the broiling art, especial attention is directed toward the novel provision in this disclosure for directing more heat toward the bottom of the food which is to be broiled than toward the top. Experience has shown that in the ordinary broiler where no such provisions are made that the article to be broiled becomes overheated or overcooked toward the upper limits thereof before the lower limits are sufficiently cooked. This proper distribution of the heat is provided for in the disclosure both by the disposing of the heating elements so that the heat emanates from points nearer the surface of the food toward the bottom than it does toward the top and, further, by the concentration of heating elements in greater amount toward the bottom. Obviously, modifications of these arrangements can be made to attain the same result. For instance, the diameter or composition of the resistance wire could be altered so that a greater resistance is provided toward the bottom to generate the greater heat with or without having recourse to the modification of the physical distribution in the illustration here given. Furthermore, as above described, the proper disposition of the reflectors 8, 8 in this broiler will aid materially in directing the heat toward the bottom of the article to be cooked.

Having thus described our invention, what we claim and desire to protect by Letters Patent is:

In a broiler, in combination, two heating elements disposed generally vertically in co-operative relation to simultaneously radiate heat toward the opposite sides of an article to be cooked and each adapted to generate a greater amount of heat at the lower portion thereof than at the upper portion, and reflecting means in operative relation to said heating elements to receive radiated heat therefrom and to reflect a preponderance of said radiated heat toward the bottom of the article to be cooked, said reflecting means extending for a substantial distance above the upper limits of said heating elements and said heating elements extending from said upper limits downwardly to limits near the bottom limits of said reflecting means.

ROBERT F. HENDERSHOT.
EDWARD R. HUGHES.